Sept. 11, 1951     E. SCHAKEL     2,567,354
DEVICE FOR MARKING OUT MEASUREMENTS ON
MATERIAL FOR GARMENTS, ETC
Filed Jan. 4, 1946

INVENTOR.

ELISABETH SCHAKEL
BY her attorneys
Howson and Howson

Patented Sept. 11, 1951

2,567,354

UNITED STATES PATENT OFFICE 2,567,354

DEVICE FOR MARKING OUT MEASUREMENTS ON MATERIAL FOR GARMENTS, ETC.

Elisabeth Schakel, Amsterdam, Netherlands

Application January 4, 1946, Serial No. 638,972
In Germany May 5, 1939

1 Claim. (Cl. 33—42)

The invention relates to a device for marking out measurements on materials for garments or on plates or sheets of any other material.

The invention has for its object to provide a device which not only may be readily adjusted to indicate any desired measurement, but with which the measuring scale and the drawing device are visible at all times, whereby a correct planning and tracing of the measurements is ensured.

For this purpose the device according to the invention consists in a measuring stick with a slide adapted to be shifted along the said stick, the slide being provided with a guide arm and a reading window, while one of the ends of the said measuring stick bears a device located at a fixed point with regard to the measurement divisions and intended for holding a piece of pencil or chalk or some other drawing means which is resting against one of the sides of the measuring stick.

According to the invention the holder for the drawing means may consist of a helical spring which is supported against one of the sides of the measuring stick by one of its end coils, while the wire at the other end of the spring is turned back inside the said spring, to form a loop which protrudes beyond the spring at the first named end and extends through an opening in the measuring stick to the other side of the measuring stick for the purpose of holding the drawing means.

It is evident that the said loop may be constructed in any form that is suitable for firmly holding the drawing means.

For example if the device is intended for marking measurements on materials for garments, the loop may have the form which is the most suitable one for receiving and holding a piece of tailor's chalk.

According to the invention, the loop may also extend through an opening provided in the measuring stick, in such a way that a drawing means placed into the said loop is held firmly against the side of the measuring stick.

The invention will now be further explained with the aid of the drawing in which similar reference characters designate corresponding parts throughout the several views.

In this drawing

Figure 1:
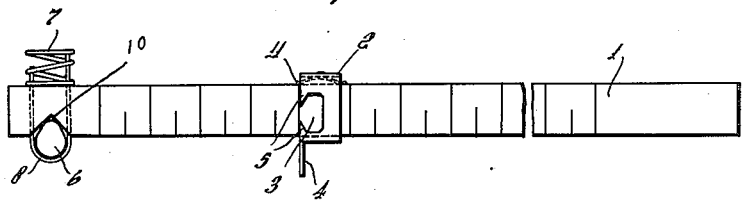
Fig. 1 is a top plan view of the device.

In the drawing the reference numeral 1 denotes a measuring stick on which a slide 2 is slidably arranged, the said slide being provided with a reading window 3 and a guide arm 4. One of the sides of the window 3 is built in the shape of two indicating points 5, the said indicating points 5 and guide arm 4 being exactly situated in a plane that is normal to the measuring stick. At the beginning of the measuring stick 1 there is provided a holder for a drawing means 6, e. g., a piece of tailor's chalk. The said holder consists of a helical spring 7, one end coil of which is resting against one of the sides of the measuring stick 1, while at the other end coil the wire from which the spring 7 is made, is bent in such a way that the said wire end is turned back inside the spring and in the shape of a loop 8 extends at the other end beyond the spring 7.

Figure 2:
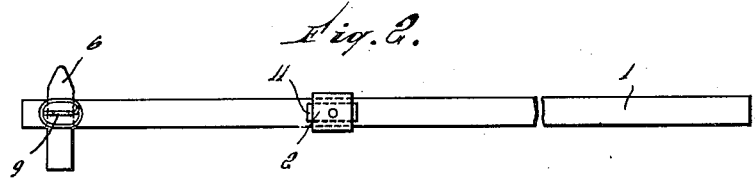
Fig. 2 is a side view.

In the measuring stick 1 there is also provided an opening 9 through which is passed the loop 8 protruding from the spring. As shown particularly in Fig. 2, the aperture 9 is substantially oblong in a cross-section taken parallel to the sides of the stick. In the side of measuring stick 1, at the place where the loop 8 is located there is likewise provided an angular recess 10, the top of which is situated in the same plane with the beginning of the graduations.

By the compression of the spring 7 a drawing device, e. g., a piece of chalk or a pencil placed in the loop 8 is firmly held in the said recess 10, the said device being adjusted in such a way that its point is located in the same plane with the top of the recess 10 and consequently with the beginning of the measurement divisions, the said plane being normal to the measuring stick.

Figure 3:
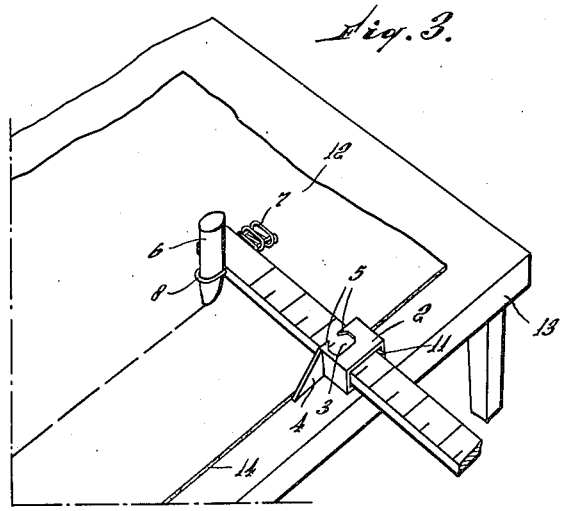
Fig. 3 represents a piece of material spread upon a table and shows in what manner, e. g., a hem may be marked out on the material.

In using the measuring device, the slide 2 is shifted along the measuring stick until the indicating points 5 point to the desired measurement division; then the device is placed on the material with the guide arm 4 touching the edge of the material to be measured, and the point of the chalk or pencil 6 resting on the material, as shown in Fig. 3. The measuring stick is then pushed across the fabric with the guide arm in contact with the edge of the material, whereby the chalk will mark the fabric accurately in accordance with the desired measurement division on the stick, as illustrated in Fig. 3.

In order to prevent an undesirable shifting of the slide 2 when it is placed in the correct position, there is provided between one of the sidewalls of the same and the side of the measuring stick a leaf spring 11 rigidly connected with the slide 2, while it is also possible to hold the said slide in its place by means of a screw not represented in the drawing.

In Fig. 3 it is shown in what manner, e. g., a hem may be marked out. For this purpose a piece of material 12 is laid on a table 13. After the device has been adjusted to the right measure, in the present case 3.5 cm., it is moved along the piece of material 12, the guide arm 4 of the slide 2 adjoining the edge 14 of the material.

It is evident from the above that any other manner of marking out measurements may be carried out in a simple and accurate way with the aid of the device according to the invention.

For accurately marking out, e. g., button holes one may first draw a line on the material to be used and then mark out the first button hole by a dash which is normal to the said line, after which other button holes are marked out by means of the device, the guide arm being each time located on the preceding dash.

In the drawing the marking out of measurements on a piece of material 12 to be made into a garment is only illustrated by way of examples. The device may also be used to advantage for marking out measurements on metal plates, wood etc., e. g., by bench workers, joiners, etc.

I claim:

A measuring device comprising a measuring stick having at one end thereof a recess and an aperture of oblong cross-section, said section being taken parallel to the sides of the stick, said aperture extending through the measuring stick from the end of the recess to the opposite side of the stick, and an indicating member slidably mounted on said stick, in combination with a marking instrument and a holder for said instrument, said holder comprising a helical spring having one end coil parallel to the side of the measuring stick opposite to that on which the recess is located, the other end of the spring having the wire from its last coil turned back inside the spring to form a loop, said loop extending into said aperture and being adapted to extend into said recess when the spring is compressed whereby the marking instrument can be passed through said loop in said recess and held in said recess by the tension exerted through the spring and loop.

ELISABETH SCHAKEL.

REFERENCES CITED

The following references are of record in the file of this patent:

UNITED STATES PATENTS

| Number | Name | Date |
| --- | --- | --- |
| 790,923 | Rohrs | May 30, 1905 |
| 1,109,274 | Altic | Sept. 1, 1914 |
| 1,254,986 | Condon et al. | Jan. 29, 1918 |
| 1,394,992 | Fry | Oct. 25, 1921 |
| 1,877,185 | Lowe | Sept. 13, 1932 |
| 2,231,270 | Huston | Feb. 11, 1941 |
| 2,435,644 | Buckett et al. | Feb. 10, 1948 |

FOREIGN PATENTS

| Number | Country | Date |
| --- | --- | --- |
| 243,867 | Switzerland | Feb. 1, 1947 |
| 345,503 | Germany | Dec. 10, 1921 |
| 831,503 | France | June 7, 1938 |